(12) United States Patent
Ohara

(10) Patent No.: US 8,171,096 B2
(45) Date of Patent: *May 1, 2012

(54) ELECTRONIC MAIL COMMUNICATION DEVICE

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/074,119

(22) Filed: Mar. 29, 2011

(65) Prior Publication Data

US 2011/0179128 A1    Jul. 21, 2011

Related U.S. Application Data

(63) Continuation of application No. 12/071,837, filed on Feb. 27, 2008.

(30) Foreign Application Priority Data

Feb. 27, 2007    (JP) .................................. 2007-046846

(51) Int. Cl.
*G06F 15/16*    (2006.01)

(52) U.S. Cl. ........................................ 709/206; 709/200

(58) Field of Classification Search .................. 709/206, 709/224, 200.2

See application file for complete search history.

(56) References Cited

U.S. PATENT DOCUMENTS

| | | | | |
|---|---|---|---|---|
| 5,745,113 A | * | 4/1998 | Jordan et al. | 715/835 |
| 7,487,216 B2 | * | 2/2009 | Miller et al. | 709/206 |
| 2001/0030960 A1 | | 10/2001 | Nakada et al. | |
| 2002/0073112 A1 | | 6/2002 | Kariya | |

FOREIGN PATENT DOCUMENTS

| | | |
|---|---|---|
| JP | 2001-142801 A | 5/2001 |
| JP | 2002-215645 A | 8/2002 |
| JP | 2002-236649 A | 8/2002 |
| JP | 2003-167826 A | 6/2003 |
| JP | 2006-074198 A | 3/2006 |

OTHER PUBLICATIONS

JP Office Action dtd Jun. 28, 2011, JP Appln. 2007-046846, English translation.

* cited by examiner

*Primary Examiner* — Ramy Mohamed Osman
*Assistant Examiner* — El Hadji Sall
(74) *Attorney, Agent, or Firm* — Banner & Witcoff, Ltd.

(57) ABSTRACT

An electronic mail communication device may be provided with a receiving device that receives an electronic mail, a sequence map creation device, and an output device. The sequence map creation device may create a sequence map in which correspondent objects corresponding to the correspondents of a series of electronic mails relating to the electronic mail received by the receiving device are arranged along an x direction, and transmission objects indicating from whom and to whom each of the series of electronic mails was transmitted are arranged along a y direction in order of the date and time of communication. The output device may output the sequence map created by the sequence map creation device.

13 Claims, 15 Drawing Sheets

FIG. 2

| Device | Owner | Mail Address | |
|---|---|---|---|
| PC20 | Tom | tom@example.com | ←—20a |
| PC60 | Mike | mike@example.com | ←—60a |
| PC62 | John | john@example.com | ←—62a |
| Server64 | ⋮ | sales-ml@example.com | ←—64a |
| | | tom@example.com<br>mike@example.com<br>john@example.com<br>⋮ | ←—64b |

| | Message-ID | From | To | Time | Message body |
|---|---|---|---|---|---|
| 72 → | 9843759237.BC7A@example.net | Tom [tom@example.com] | Mike [mike@example.com] | 06/12/21 15:11:13 | ... |
| 74 → | 256257245.ABC08@example.net | Mike [mike@example.com] | Tom [tom@example.com] | 06/12/21 15:16:33 | ... |
| 76 → | 0976554355.B7C00@example.net | Tom [tom@example.com] | SALES-ML [sales-ml@example.com] | 06/12/21 16:17:14 | ... |
| 78 → | 275054754.DFEBA@example.net | ? | ? | ? | ? |
| 80 → | 575054754.BAF00@example.net | Mike [mike@example.com] | SALES-ML [sales-ml@example.com] | 06/12/22 11:20:13 | ... |
| 82 → | 192546024.C7BB8@example.net | Tom [tom@example.com] | SALES-ML [sales-ml@example.com] | 06/12/22 11:22:07 | ... |

| Device | Owner | Mail Address | |
|---|---|---|---|
| Printer220 | Tom | tom@example.com | —220a |
| PC260 | Mike | mike@example.com | —260a |
| PC262 | John | john@example.com | —262a |

ELECTRONIC MAIL COMMUNICATION DEVICE

CROSS-REFERENCE TO RELATED APPLICATION

This application is a continuation of U.S. application Ser. No. 12/071,837, filed Feb. 27, 2008, which claims priority to Japanese Patent Application No. 2007-046846, filed on Feb. 27, 2007, the contents of which are hereby incorporated by reference into the present application.

BACKGROUND OF THE INVENTION

1. Field of the Invention

The present invention relates to an electronic mail communication device that can communicate electronic mail.

2. Description of the Related Art

Systems that communicate electronic mails between a plurality of devices are widely known. For example, this type of system is disclosed in US Patent Application Publication No. 2001/0030960. When electronic mails are to be communicated, replies may be used. Widely known electronic mail software can include information of the original electronic mail (the sender, recipient, title, message, date and time of communication, etc.) in the text of the reply electronic mail.

BRIEF SUMMARY OF THE INVENTION

There are times in which one would like to know the reply history of an electronic mail. As noted above, conventional electronic mail software can include information of the original electronic mail in the text of the reply electronic mail. Because of this, the recipient of the reply electronic mail can know the reply history of that electronic mail by examining the text of that electronic mail. However, the task of examining the text of that electronic mail is time consuming.

The present specification discloses technology that can provide information regarding the reply history of an electronic mail to a user (recipient of the electronic mail). Due to the disclosure of this technology, it can be expected that the user will easily understand the reply history of the electronic mail.

One of the technologies disclosed by the present specification may be an electronic mail communication device. This electronic mail communication device may comprise a receiving device that receives an electronic mail, a sequence map creation device, and an output device. The sequence map creation device may create a sequence map in which correspondent objects corresponding to the correspondents in a series of electronic mails relating to the electronic mail received by the receiving device are arranged along an x direction, and transmission objects indicating from whom and to whom each of the series of electronic mails was transmitted are arranged along a y direction in order of the date and time of communication. The output device may output the sequence map created by the sequence map creation device. For example, the output device may display the sequence map. The output device may print the sequence map.

Each of the aforementioned terms may be defined as follows.

(1) "Series of electronic mails relating to the electronic mail received by the receiving device" means original electronic mails of the received electronic mail. For example, in the event that a first electronic mail was sent, a second electronic mail was replied based on the first electronic mail, a third electronic mail was replied based on the second electronic mail, and a fourth electronic mail was replied based on the third electronic mail, a "series of electronic mails relating to the fourth electronic mail" includes at least the first electronic mail, the second electronic mail, and the third electronic mail. Note that the "series of electronic mails relating to the fourth electronic mail" may also include the fourth electronic mail itself.

(2) A "series of electronic mails relating to the electronic mail received by the receiving device" may also include an electronic mail that was previously forwarded. For example, in the event that the aforementioned first electronic mail was forwarded based on a fifth electronic mail, a "series of electronic mails relating to the fourth electronic mail" may also include the fifth electronic mail.

(3) The aforementioned "correspondents" are a concept that includes recipients and senders.

(4) "Correspondent objects . . . are arranged along an x direction" means that the correspondent objects are offset in the x direction. The correspondent objects may also be offset in the y direction, or need not be offset in the y direction.

(5) "Transmission objects . . . are arranged along a y direction" means that the transmission objects are offset in the y direction. The transmission objects may also be offset in the x direction, or need not be offset in the x direction.

(6) The x direction and y direction need not necessarily be in a perpendicular relationship with each other. The x direction and y direction may be set to any relationship as long as these are not in a parallel relationship.

For example, in the event that a first electronic mail was sent from correspondent C1 to correspondent C2, a second electronic mail was replied from the correspondent C2 based on the first electronic mail, a third electronic mail was replied from the correspondent C1 based on the second electronic mail, and a fourth electronic mail was replied from the correspondent C2 based on the third electronic mail, a sequence map that will be created with regard to the fourth electronic mail may include a correspondent object S1 of the correspondent C1 and a correspondent object S2 of the correspondent C2. Each correspondent object S1, S2 is arranged along the x direction. In addition, the sequence map may include at least a transmission object T1 of the first electronic mail, a transmission object T2 of the second electronic mail, and a transmission object T3 of the third electronic mail (a transmission object T4 of the fourth electronic mail may also be included). The transmission object T1 and the transmission object T3 may have a shape that indicates transmission from the correspondent C1 to the correspondent C2. In addition, the transmission object T2 may have a shape that indicates transmission from the correspondent C2 to the correspondent C1. Each transmission object T1, T2, T3 is arranged along the y direction in order of the date and time of communication (in the sequence T1, T2, T3). The reply history of the fourth electronic mail will be output. Because of this, the correspondent C1 (the recipient of the fourth electronic mail) can understand the reply history of the fourth electronic mail.

BRIEF DESCRIPTION OF THE DRAWINGS

FIG. 2 is a table showing the user and mail address of each device.

FIG. 8 shows an example of a thread table.

FIG. 11 is a table showing the user and mail address of each device.

DETAILED DESCRIPTION OF THE PREFERRED EMBODIMENT

First Embodiment

Figure 1:
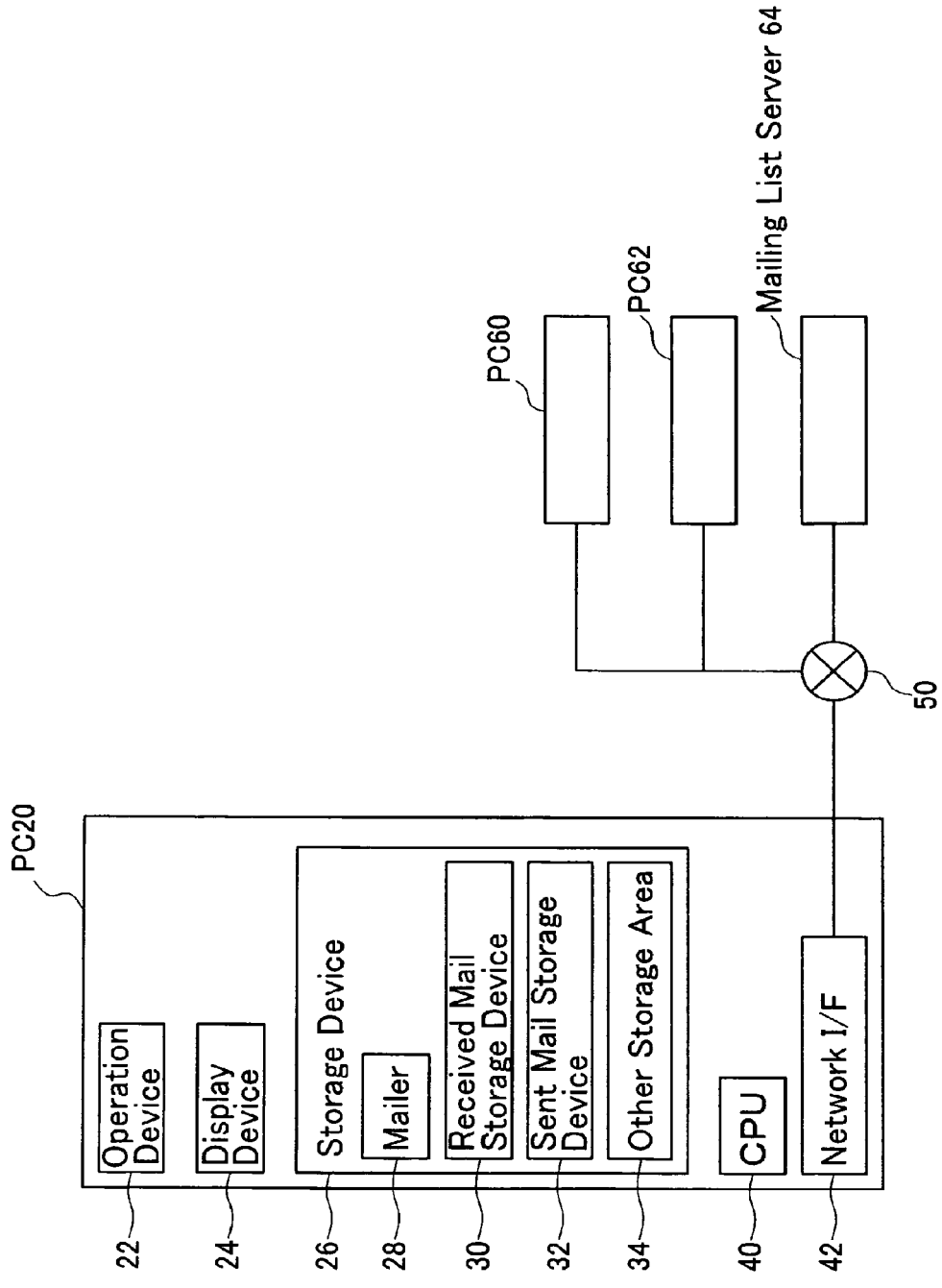
FIG. 1 shows a schematic diagram of an electronic mail system of a first embodiment.

An embodiment will be described with reference to the drawings. FIG. 1 shows the structure of an electronic mail system 10 of the present embodiment. The electronic mail system 10 comprises a plurality of personal computers 20, 60, 62 (hereinafter referred to as "PCs"), a mailing list server 64, Internet 50, etc. Note that in FIG. 1, illustration of the mail servers (SMTP server, POP3 server, etc.) has been omitted.

(Construction of the PCs)

The PC 20 has an operation device 22, a display device 24, a storage device 26, a CPU 40, a network interface 42, etc. The operation device 22 is operated by a user. The operation device 22 has, for example, a keyboard and a mouse. The user can input various data and commands into the PC 20 by operating the operation device 22. The display device 24 can display various data. The content of the data displayed by the display device 24 will be described in detail below. The storage device 26 is comprised of ROM, RAM, EEPROM, etc. The storage device 26 stores a mailer 28 (electronic mail software). In addition, the storage device 26 has a received mail storage device 30, a sent mail storage device 32, other storage area 34, etc. The received mail storage device 30 can store electronic mails received by the PC 20. The sent mail storage device 32 can store electronic mails sent by the PC 20. The storage area 34 can store various data. The content of the data stored by the storage area 34 will be described in detail below. The CPU 40 will execute various processes in accordance with programs stored in the storage device 26 (e.g., the mailer 28), and will perform overall control of each device 24, 26, etc.

The network interface 42 is connected to the Internet 50. The network interface 42 can send various data to the Internet 50, and can receive various data sent via the Internet 50. For example, the PC 20 can communicate (send or receive) an electronic mail via the network interface 42.

Each of the other PCs 60, 62 have a construction that is identical to the PC 20. In other words, each PC 60, 62 also has the operation device, the display device, the storage device, the CPU, the network interface, etc. Each PC 60, 62 is connected to the Internet 50. In addition, the mailing list server 64 (hereinafter referred to as a "server") also has substantially the same construction as the PC 20. The server 64 is also connected to the Internet 50. The server 64 can execute a mail sending process that differs from the PC 20, 60, 62. This will be described later.

FIG. 2 is a table showing owners (users) and mail addresses of each device 20, 60, 62, and 64. The PC 20 is owned by "Tom". A mail address 20a of "tom@example.com" is set in the PC 20. Electronic mails sent to this mail address 20a will be received by the PC 20. The owners of the other PCs 60, 62 are also determined, and the mail addresses 60a, 62a are set. An electronic mail address 64a of "sales-ml@example.com" is set in the server 64. Electronic mails sent to this electronic mail address 64a will be received by the server 64. The server 64 stores a mailing list 64b. The mailing list 64b includes the electronic mail addresses 20a, 60a, 62a that are set in the aforementioned PCs 20, 60, 62. When the server 64 receives an electronic mail sent to the electronic mail addresses 64a, the server 64 sends this electronic mail to each electronic mail address 20a, 60a, 62a stored in the mailing list 64b.

(Example of Electronic Mail Communication)

Figure 3:
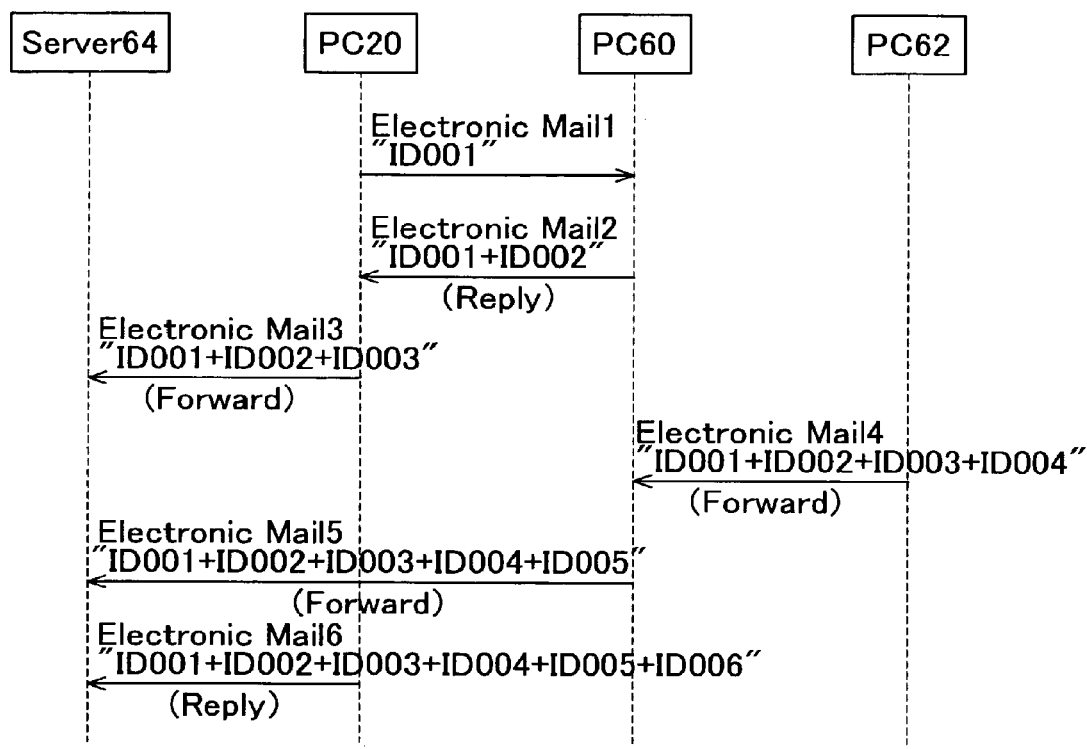
FIG. 3 shows an example of electronic mails communicated between each device.

FIG. 3 shows an example of electronic mails communicated between each of the aforementioned devices 20, 60, 62, 64. In the example of FIG. 3, an electronic mail 1 is sent from the PC 20 to the PC 60. The PC 20 creates a message ID (also referred to as a reference ID) and adds this to the electronic mail 1. In the example of FIG. 3, the message ID "ID001" is included in the electronic mail 1. In FIG. 3, the message ID is shown in simplified form. The actual message ID may include a long, complex text string because each electronic mail must have a unique ID. An example of an actual message ID will be explained below with reference to FIG. 4. Note that a detailed explanation of the method of creating the message ID will be omitted because this method is well known. The PC 60 replies an electronic mail 2 to the PC 20 based on the electronic mail 1. The PC 60 creates a message ID "ID002" and adds this to the electronic mail 2. This will result in the electronic mail 2 having both "ID001" and "ID002". The PC 20 forwards an electronic mail 3 to the server 64 based on the electronic mail 2. The PC 20 creates a message ID "ID003" and adds this to the electronic mail 3. The electronic mail 3 includes "ID001" to "ID003". The server 64 receives the electronic mail 3, and sends the electronic mail 3 to each electronic mail address 20a, 60a, 62a included in the mailing list 64b. In other words, each PC 20, 60, 62 receives the electronic mail 3.

The PC 62 forwards an electronic mail 4 to the PC 60 based on the electronic mail 3. The electronic mail 4 includes "ID001" to "ID004". The PC 60 forwards an electronic mail 5 to the server 64 based on the electronic mail 4. The electronic mail 5 includes "ID001" to "ID005". The server 64 receives the electronic mail 5, and sends the electronic mail 5 to each electronic mail address 20a, 60a, 62a. Each PC 20, 60, 62 receives the electronic mail 5. The PC 20 forwards an electronic mail 6 to the server 64 based on the electronic mail 5. The electronic mail 6 includes "ID001" to "ID006". The server 64 receives the electronic mail 6, and sends the electronic mail 6 to each electronic mail address 20a, 60a, 62a. Each PC 20, 60, 62 receives the electronic mail 6.

(Data Structure of Electronic Mail)

Figure 4:
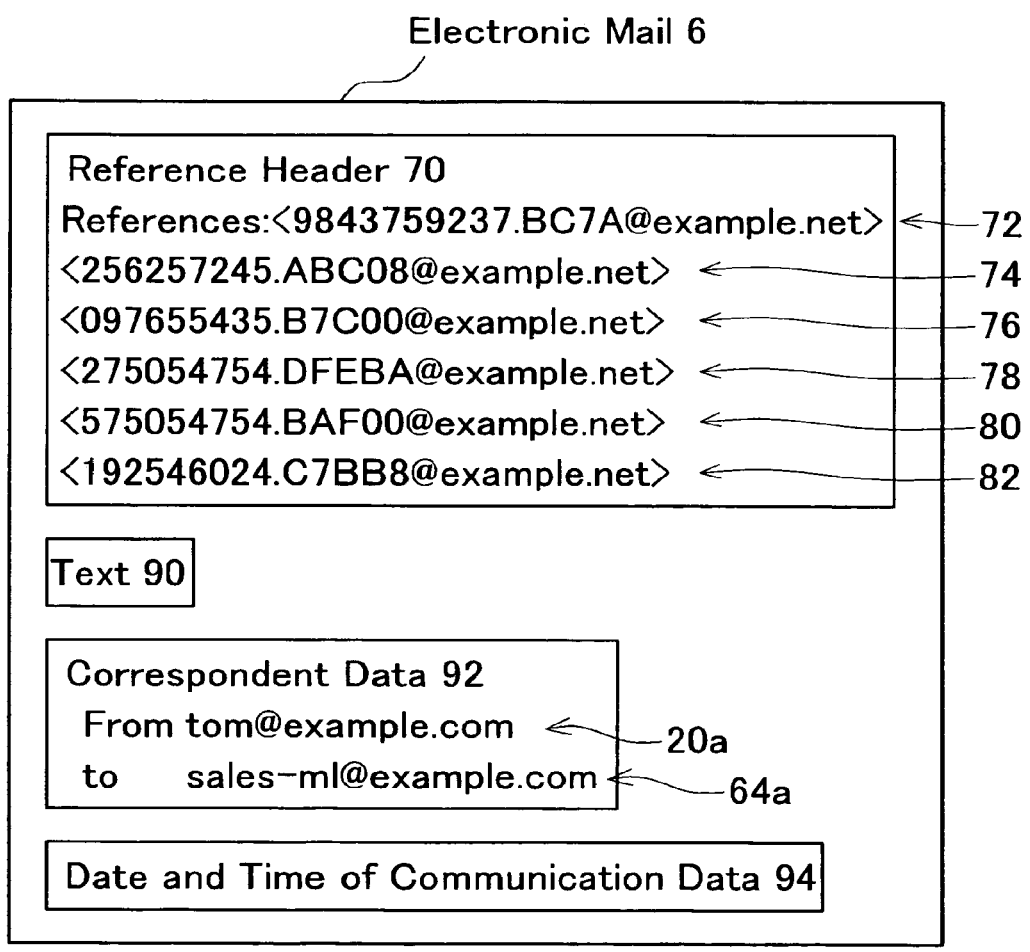
FIG. 4 shows the data structure of an electronic mail.

The data structure of the electronic mail 6 that was sent in the example of FIG. 3 will be described. FIG. 4 shows the data structure of the electronic mail 6. The electronic mail 6 includes a reference header 70, text 90, correspondent data 92, and date and time of communication data 94. The reference header 70 includes six message IDs 72 to 82. As shown in FIG. 4, the message IDs 72 to 82 include long, complex text strings. The message ID 72 corresponds to "ID001" of FIG. 3. Likewise, the message IDs 74 to 82 correspond to "ID002" to "ID006" of FIG. 3. The six message IDs 72 to 82 in the reference header 70 are arranged in order of the date and time they were communicated. The message ID 72 is the oldest one, and the message ID 82 is the newest one. The text 90 is text string data of the text of the electronic mail 6. The correspondent data 92 includes the electronic mail address 20a of the sender of the electronic mail 6, and the electronic mail address 64a of the recipient of the electronic mail 6. Note that the correspondent data 92 may also include the name of the correspondent (e.g., "Tom" etc.), and not only the electronic mail addresses 20, 64*a*. The date and time of communication data 94 is data indicating the date and time that the electronic mail 6 was communicated.

The electronic mails 1 to 5 also have data structures that are identical to that of the electronic mail 6. For example, the electronic mail 5 has a reference header that includes five message IDs 72 to 80. In addition, the electronic mail 5 also has a text, correspondent data, and date and time of communication data. The correspondent data of the electronic mail 5 includes the electronic mail address 60*a* of the sender (the electronic mail address of PC 60), and the electronic mail address 64*a* of the recipient (the electronic mail address of the server 64). The date and time of communication data of the electronic mail 5 has a date and time of communication that is older than the date and time of communication of the electronic mail 6.

(Processes Executed by the PCs)

Figure 5:
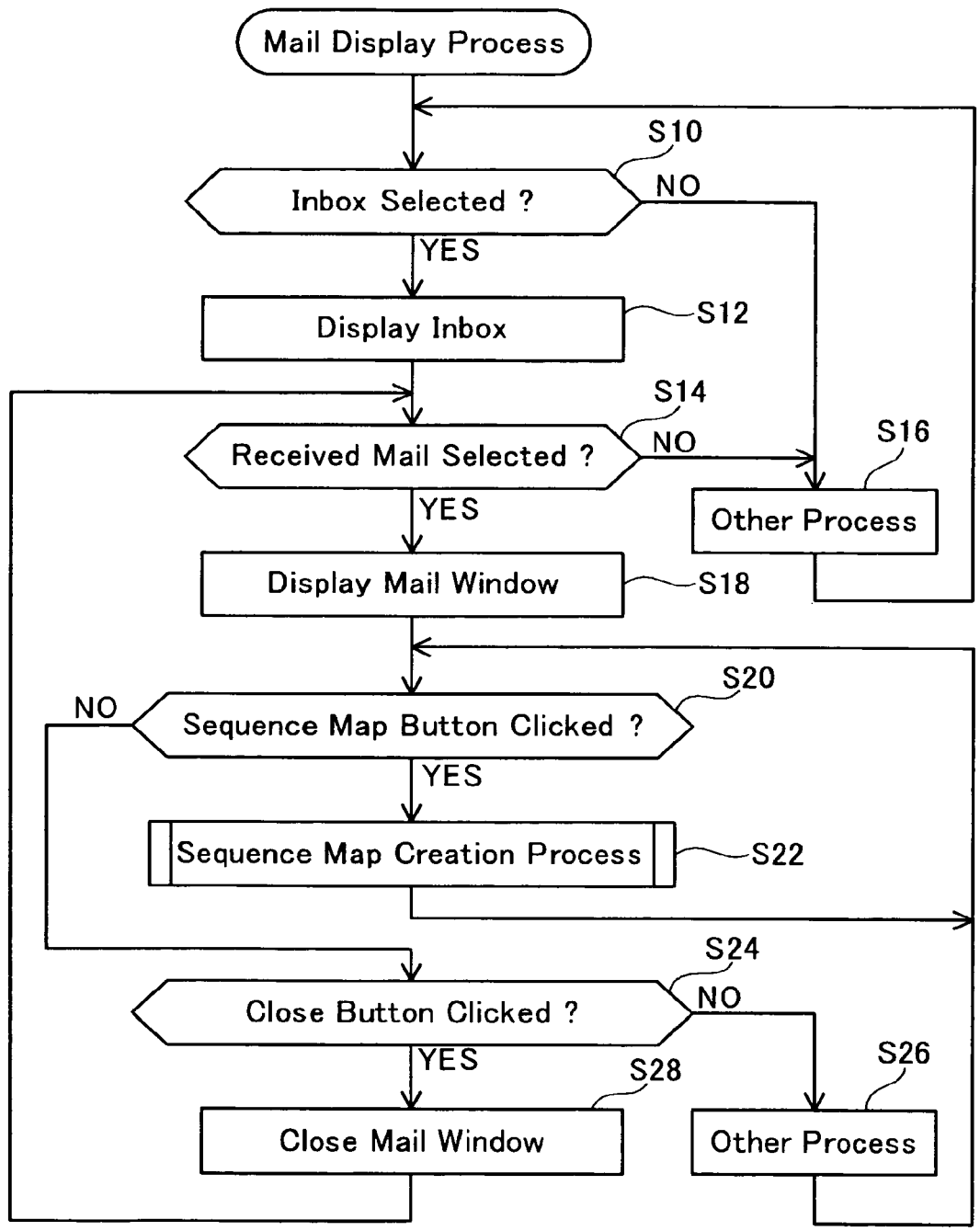
FIG. 5 shows a flowchart of a mail display process.

Next, the content of the processes executed by the PC 20 will be described. Each of the other PCs 60, 62 can also execute the same processes as the PC 20. Because of this, an explanation of the processes executed by the PC 60, 62 will be omitted. FIG. 5 shows a flowchart of a mail display process executed by the PC 20. The user can activate the mailer 28 by operating the operation device 22. In this way, an image that allows the user to select an inbox, outbox, creation of new mail, etc., will be displayed on the display device 24. The user can select (e.g., click) the inbox etc. by operating the operation device 22. The CPU 40 observes whether or not the inbox has been selected by the user (S10). If the answer is YES here, the flow will proceed to S12. On the other hand, if another operation was executed by the user (e.g., if the outbox was selected), the CPU 40 determines that the answer in S10 is NO. In this case, the CPU 40 executes another process in response to the user's operation (S16).

In S12, the CPU 40 displays the inbox. In other words, the CPU 40 displays a list (sender, title, date and time of communication, etc.) of received mails that are stored in the received mail storage device 30. Illustration of a specific display example of the inbox will be omitted. The user can select one received mail from the list of the received mails by operating the operation device 22. In this case, the CPU 40 determines that the answer in S14 is YES, and the flow proceeds to S18. On the other hand, if another operation was executed by the user, the CPU 40 determines that the answer in S14 is NO. In this case, the CPU 40 executes another process in response to the user's operation (S16).

Figure 6:
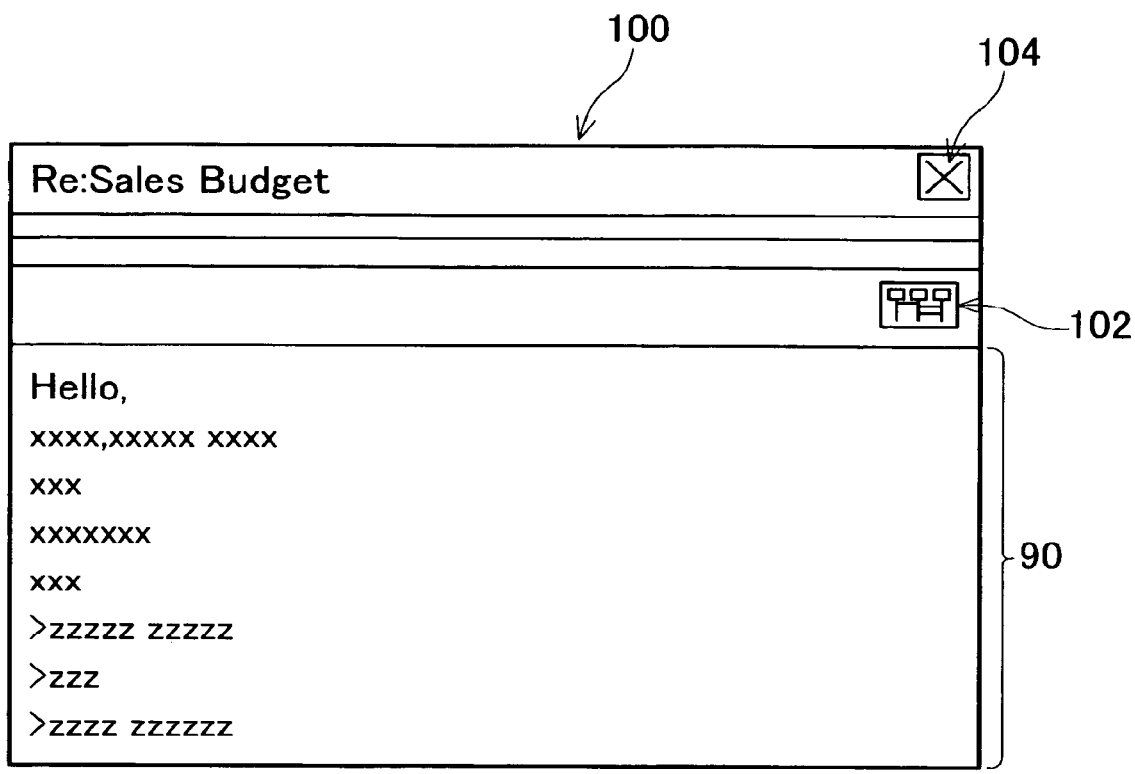
FIG. 6 shows an example of a mail window.

In S18, the CPU 40 displays a mail window of the received mail selected in S14. FIG. 6 shows an example of the mail window. The mail window 100 includes a text 90 of the electronic mail. In addition, although illustration thereof is omitted, the mail window 100 includes a sender (name and electronic mail address of the sender), date and time of communication, recipient (name and electronic mail address of the recipient), and title. The mail window 100 includes a sequence map button 102 and a close button 104. The user can click the buttons 102, 104 by operating the operation device 22. If the sequence map button 102 is clicked, the CPU 40 determines that the answer in S20 is YES, and executes a sequence map creation process (S22). The sequence map creation process will be described later. If the close button 104 is clicked, the CPU 40 determines that the answer in S24 is YES, and closes the mail window (S28). If another operation was executed by the user, the CPU 40 determines that the answer in S24 is NO. In this case, the CPU 40 executes another process in response to the user's operation (S26).

Figure 7:
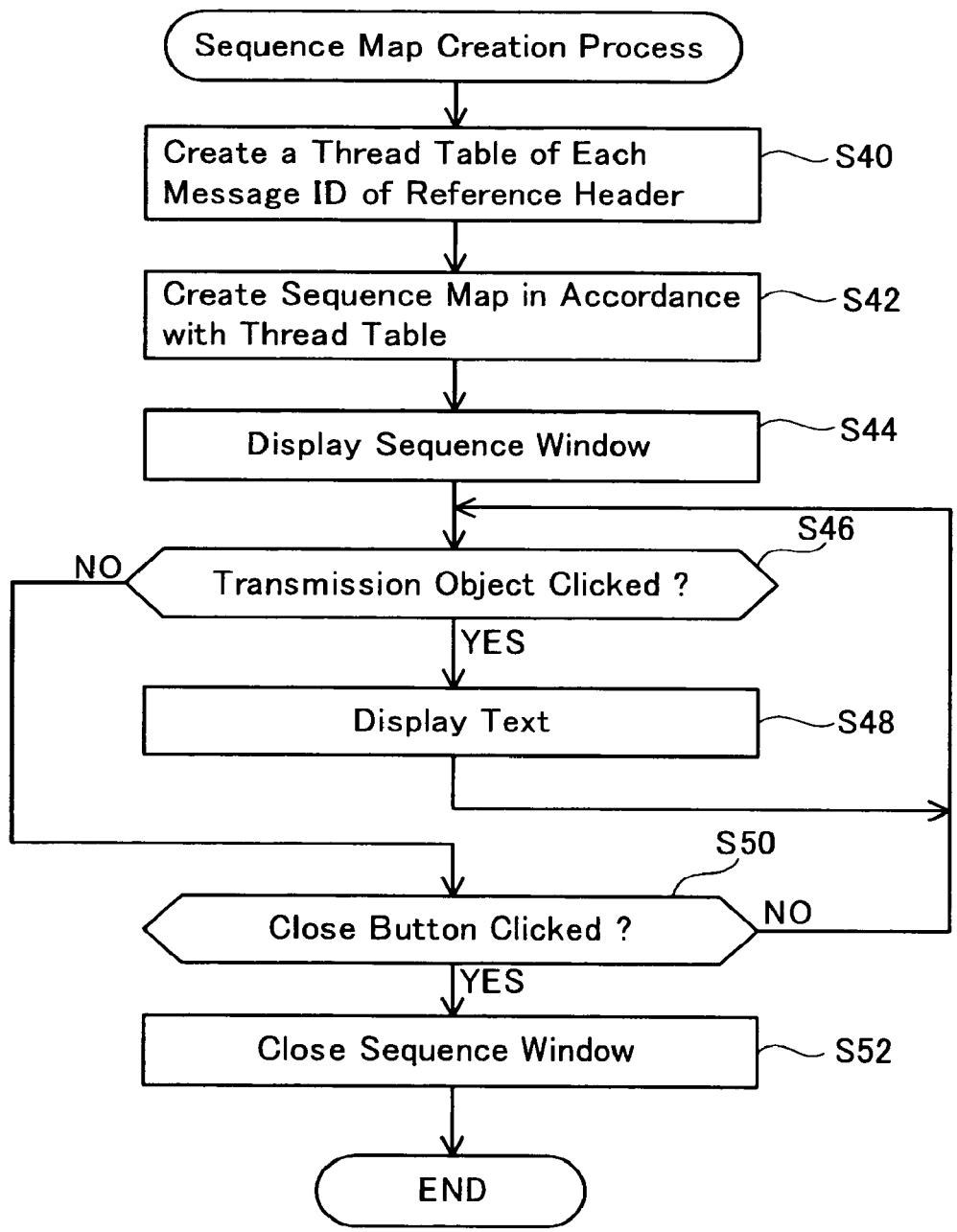
FIG. 7 shows a flowchart of a sequence map creation process.

Next, the sequence map creation process (the process of S22 of FIG. 5) will be explained. FIG. 7 shows a flowchart of the sequence map creation process. First, the CPU 40 executes a process that creates a thread table (S40). The CPU 40 reads message ID 72 etc. from the reference header 70 (see FIG. 4) included in the electronic mail that was opened in the mail window 100 (the received mail that was selected in S14 of FIG. 5). For example, if the electronic mail that is the subject of the present process is the electronic mail 6 of FIG. 3, the CPU 40 reads the six message IDs 72 to 82 included in the reference header 70 of the electronic mail 6. Next, the CPU 40 creates the thread table based on the message IDs 72 to 82. The thread table is stored in the storage area 34.

FIG. 8 shows the thread table created with regard to the electronic mail 6. The thread table 110 is a table in which a message ID 112, sender 114, recipient 116, date and time of communication 118, and text 120 have been associated with each other. The message IDs 72 to 82 included in the reference header 70 are arranged in the column 112. The six message IDs 72 to 82 are arranged in accordance with the order they are arranged in the reference header 70. In other words, the oldest message ID 72 is arranged in the uppermost position, and the newest message ID 82 is arranged in the lowermost position. The CPU 40 searches the received mail storage device 30 and the sent mail storage device 32 using the message ID 72 as a key, and identifies the electronic mail corresponding to the message ID 72 (the electronic mail 1 in the present embodiment (see FIG. 3)). More specifically, the CPU 40 identifies an electronic mail (that is, the electronic mail 1) having the message ID 72 in the reference header as the newest message ID. The electronic mail 1 of the present embodiment is a mail that was sent from the PC 20 to the PC 60, and is to be stored in the sent mail storage device 32. Because of this, the electronic mail 1 is to be identified from the sent mail storage device 32. The CPU 40 identifies the sender, recipient, data and time of communication, and text from the electronic mail 1. The CPU 40 writes each identified data to the thread table 110. Note that in the example of FIG. 8, both the mail address and the name (Tom, Mike, SALES-ML) are included in the column 114 and the column 116. However, only the mail addresses, or only the names, may be included in the columns 114, 116.

Likewise, the CPU 40 executes a process that identifies the other electronic mails corresponding to each of the other message IDs 74 to 82, and writes this data into the thread table 110. For example, the electronic mail 2 that corresponds to the message ID 74 (see FIG. 3) was sent as a reply from the PC 60 to the PC 20, and is to be stored in the received mail storage device 30. Because of this, the electronic mail 2 is to be identified from the received mail storage device 30. The CPU 40 identifies the sender, recipient, the date and time of communication, and text from the electronic mail 2, and each of the identified data is written into the thread table 110. Note that the electronic mail 4 that corresponds to the message ID 78 (see FIG. 3) was forwarded from the PC 62 to the PC 60, and is not stored in the received mail storage device 30 and the sent mail storage device 32 of PC 20. Thus, the CPU 40 cannot identify the electronic mail 4 of the message ID 78. In this case, the CPU 40 cannot write the sender, recipient, data and time of communication, and text into the thread table 110. In the example of FIG. 8 as well, the sender 114, recipient 116, data and time of communication 118, and text 120 corresponding to the message ID 78 is not written.

Figure 9:
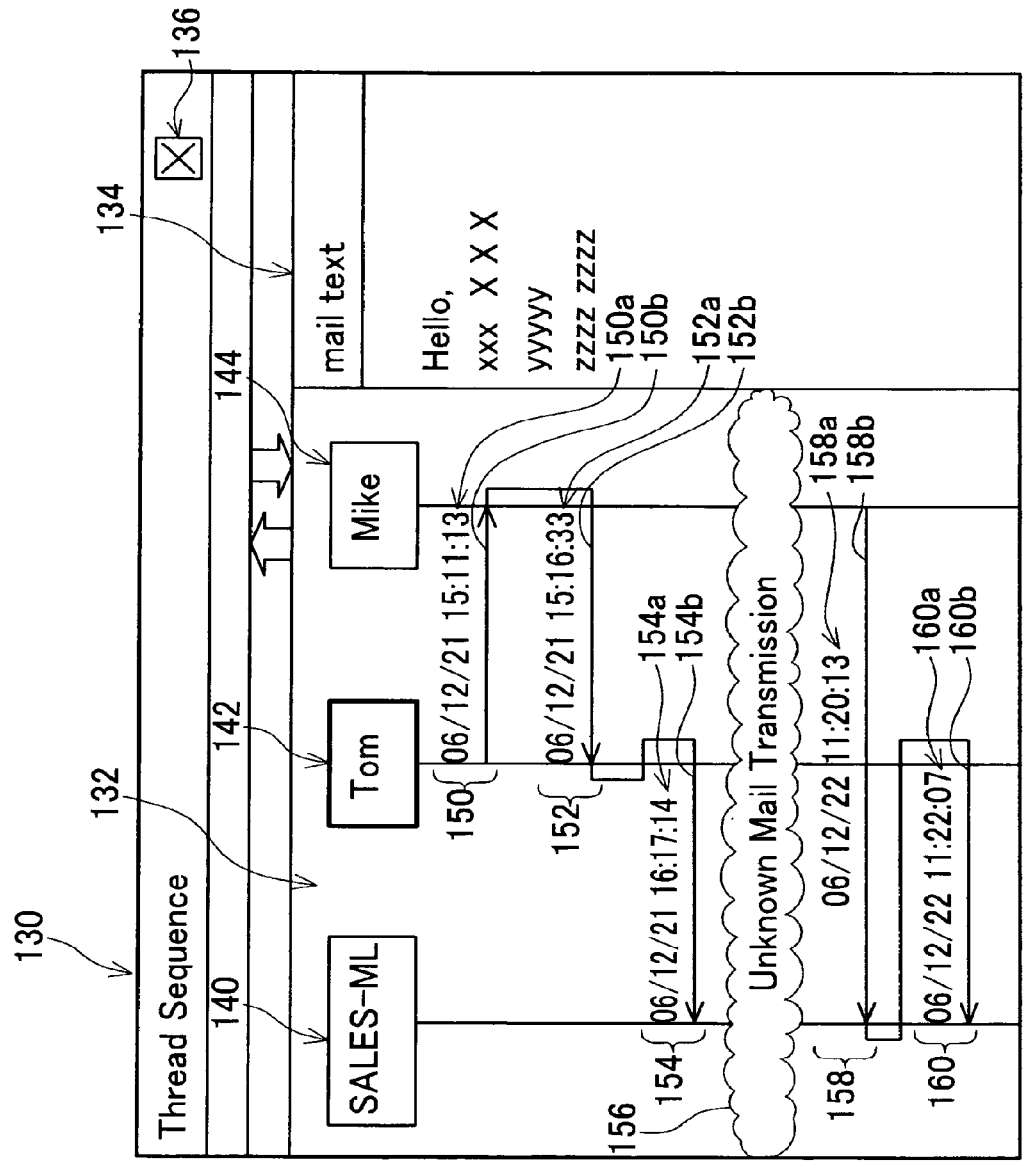
FIG. 9 shows an example of a sequence map.

When the CPU 40 completes the process that creates the thread table 110, it executes a process that creates a sequence map (S42). The specific method of creating the sequence map will be described below with reference to FIG. 9. Next, the CPU 40 displays a sequence window (S44). FIG. 9 shows an example of the sequence window created in accordance with the thread table 110 (the electronic mail 6) of FIG. 8. The sequence window 130 has a sequence map 132 and a text display area 134. The sequence map 132 includes a plurality of correspondent objects 140, 142, 144, a plurality of transmission objects 150, 152, 154, 158, 160, and an unknown object 156.

Each of the correspondent objects 140, 142, 144 corresponds to electronic mail correspondents (senders and recipients). The correspondent objects 140, 142, 144 correspond to the correspondents that can be identified from the columns 114, 116 of the thread table 110. "Tom", "Mike" and "SALES-ML" are present in the columns 114, 116 of FIG. 8, but "John" (the owner of PC 62) is not present therein. Because of this, the correspondent object that corresponds to "John" is not present in FIG. 9. The correspondent objects 140, 142, 144 are aligned in the horizontal direction (hereinafter referred to as the "x direction"). In other words, each of the correspondent objects 140, 142, 144 is offset in the horizontal direction. The correspondent objects 140, 142, 144 are aligned in the same positions in the vertical direction (hereinafter referred to as the "y direction"). Note that the correspondent object 142 that corresponds to the PC 20 itself is displayed with a shape that differs from the other correspondent objects 140, 144. The other correspondent objects 140, 144 have the same shape. In the present embodiment, the correspondent object 142 is drawn with a line that is thicker than that of the correspondent objects 140, 144. Note that the mail address may be written in the correspondent objects 140, 142, 144 instead of the names "Tom", "Mike", and "SALES-ML".

Each of the transmission objects 150, 152, 154, 158, 160 corresponds to the electronic mail 1, 2, 3, 5, 6 (message IDs 72, 74, 76, 80, 82). The unknown object 156 corresponds to the electronic mail 4 (message ID 78). The transmission objects 150, etc. and the unknown object 156 are aligned in the vertical direction. In other words, each of the transmission objects 150, etc. and the unknown object 156 are offset in the vertical direction. The transmission objects 150, etc. and the unknown object 156 are aligned according to the date and time of communication. The transmission object 150 corresponding to the oldest electronic mail 1 is arranged in the uppermost position, and the transmission object 160 corresponding to the newest electronic mail 6 is arranged in the lowermost position. The transmission object 150 includes a communicated date object 150*a* and an arrow object 150*b*. The communicated date object 150*a* indicates the date and time of communication of the electronic mail 1. The arrow object 150*b* indicates from whom to whom the electronic mail 1 was sent. In the case of the arrow object 150*b*, the arrow extends from the correspondent object 142 to the correspondent object 144. This means that the electronic mail 1 was sent from "Tom" (PC 20) to "Mike" (PC 60). Each of the other transmission objects 152, 154, 158, 160 also include communicated date objects 152*a*, 154*a*, 158*a*, 160*a* and arrow objects 152*b*, 154*b*, 158*b*, 160*b*. Note that the unknown object 156 includes a text string that indicates the fact that a certain electronic mail was sent. However, the unknown object 156 need not include a text string.

Although this will be described again below, the user can select one of the transmission objects (e.g., 150) from the sequence map 132 by operating the operation device 22. In this case, the text of the selected electronic mail (e.g., electronic mail 1) will be displayed in the text display area 134.

The CPU 40 executes each of the following processes in order to create the sequence map 132 in S42.

(1) The CPU 40 identifies the correspondents from the columns 114, 116 of the thread table 110. In the present embodiment, "Tom", "Mike", and "SALES-ML" are identified.

(2) The CPU 40 creates the correspondent objects 140, 142, 144 for each of the correspondents identified in the above process (1), and arranges each of the correspondent objects 140, 142, 144 along the horizontal direction. The CPU 40 draws the correspondent object 142 corresponding to the PC 20 with lines thicker than those of the other correspondent objects 140, 144.

(3) The CPU 40 creates the transmission object 150 based on the oldest message ID 72 (message ID 72 arranged in the uppermost position in the thread table 110). First, the CPU 40 creates the arrow object 150*b* that extends from the x coordinate (the position in the x direction) that corresponds to the correspondent object 142 of the sender "Tom" associated with the message ID 72, to the x coordinate that corresponds to the correspondent object 144 of the recipient "Mike" associated with the message ID 72. Then, the CPU 40 creates the communicated date object 150*a* that indicates the date and time of communication of "06/12/21/15:11:13" associated with the message ID 72. In this way, the transmission object 150 is completed.

(4) The CPU 40 executes the same process as in the above process (3) for the next oldest message ID 74. In this way, the transmission object 152 is completed. The transmission object 152 is arranged below the transmission object 150. The CPU 40 executes the same process as in the above process (3) for the message ID 76. In this way, the transmission object 154 is completed. The transmission object 154 is arranged below the transmission object 152. On the other hand, the sender, etc. will not be associated with the message ID 78. Because of this, the CPU 40 creates the unknown object 156. The unknown object 156 is arranged below the transmission object 154. The CPU 40 executes the same process as in the above process (3) for each message ID 80 and 82. In this way, the transmission objects 158, 160 are completed. The transmission object 158 is arranged below the unknown object 156, and the transmission object 160 is arranged below the transmission object 158.

The sequence map is completed by the above processes (1) to (4) (S42). In this way, it is possible to display the sequence map 132 (the sequence window 130) (S44). The user can click any of the transmission objects in the sequence map by operating the operation device 22. In the event that any of the transmission objects is clicked, the CPU 40 determines that the answer in S46 is YES. In this case, the CPU 40 displays the text of the electronic mail corresponding to the transmission object that was clicked. The text is displayed in the text display area 134 (S48). For example, in the event that the transmission object 150 is clicked, the CPU 40 identifies the text written in the column 120 associated with the message ID 72 (the electronic mail 1) in the thread table 110, and displays the identified text in the text display area 134. In this way, the text of the electronic mail 1 is displayed in the text display area 134. In addition, the user can click the close button 136 in the sequence window 130 by operating the operation device 22. In this case, the CPU 40 determines that the answer in S50 is YES, and closes the sequence window 130 (S52). In this way, the sequence map creation process is completed.

The PC 20, etc. of the present embodiment can create the sequence map 132 for the received mail. The user can easily understand the reply history and the forwarding history of the received mail by viewing the sequence map 132. PCs that implement an extremely useful function will thereby be achieved.

Second Embodiment

Figure 10:
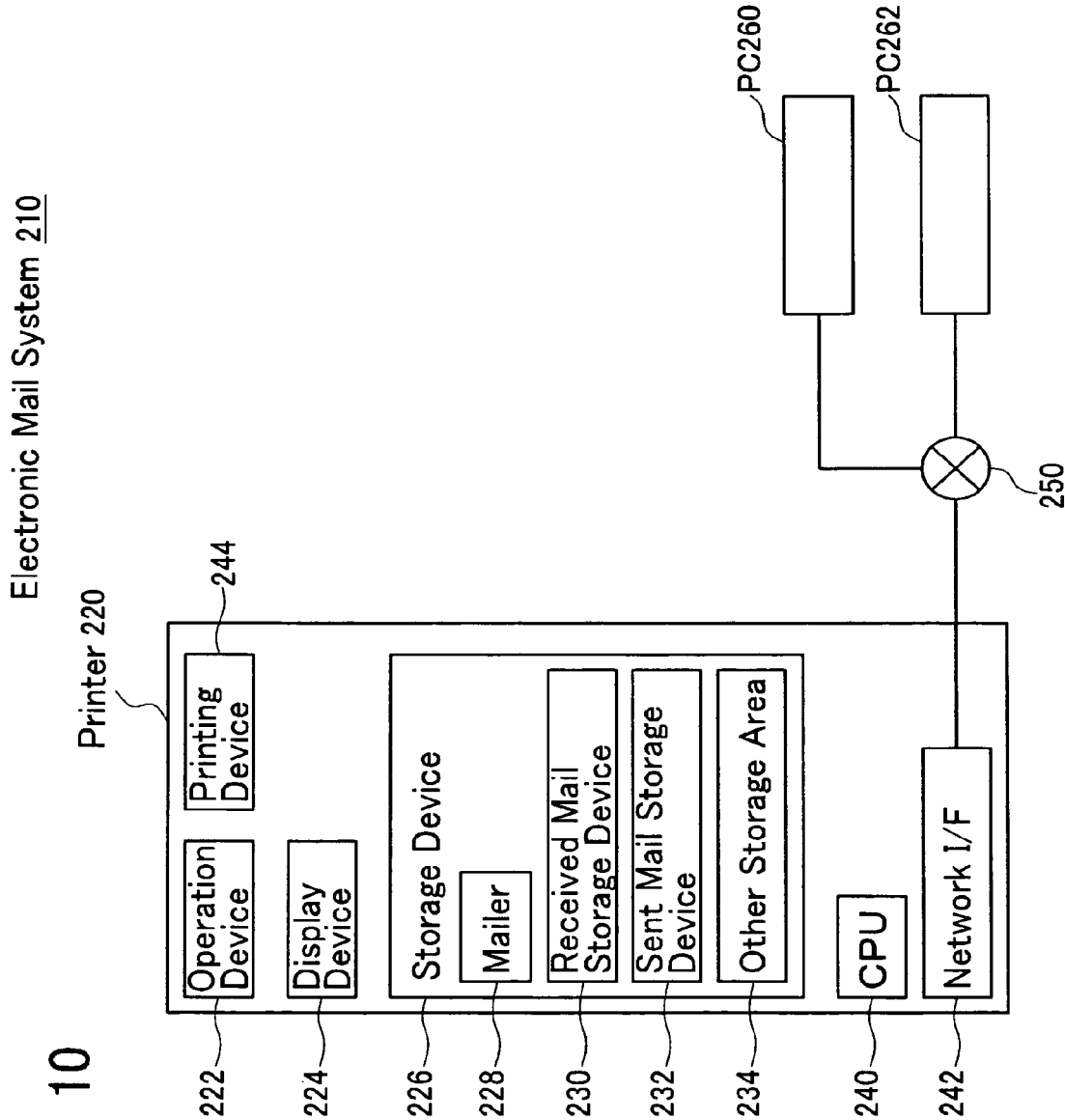
FIG. 10 shows a schematic diagram of an electronic mail system of a second embodiment.

Next, a second embodiment of the present invention will be described. FIG. 10 shows the structure of an electronic mail system 210 of the present embodiment. The electronic mail system 210 comprises a printer 220, a plurality of PCs 260, 262, Internet 250, etc.

(Construction of the Printer)

The printer 220 has substantially the same construction as the PC 20 of the first embodiment, except for the portions that comprise a printing device 244. In other words, the printer 220 has, in addition to the printing device 244, an operation device 222, a display device 224, a storage device 226, a CPU 240, a network interface 242, etc. The operation device 222 differs from the operation device 22 of the PC 20, and does not have a keyboard and mouse. The operation device 222 has a plurality of keys that is operated by a user. For example, the operation device 222 has a print key, a setting key, up/down keys, a return key, etc. The display device 224 has a display that is small compared to the PC 20. The storage device 226, like the PC 20 of the first embodiment, has a mailer 228, a received mail storage device 230, a sent mail storage device 232, and the other storage area 234. The mailer 228 of the present embodiment has a program that differs from the mailer 28 of the first embodiment. This point will be described in detail later. The CPU 240 will execute various processes in accordance with programs stored in the storage device 226 (e.g., the mailer 228), and will perform overall control of each device 224, 226, 244, etc. The network interface 242 is connected to the Internet 250. The printer 220 can communicate (send or receive) an electronic mail via the network interface 242.

The PCs 260, 262 have substantially the same construction as the PCs 60, 62 of the first embodiment. However, the mailer installed in the PCs 260, 262 have a program that differs from the mailer 28 of the first embodiment, and can implement the same functions as the mailer 228 of the printer 220. This point will be described in detail later.

FIG. 11 is a table showing the owners (users) and mail addresses of each device 220, 260, 262. As is clear from viewing FIG. 11, mail addresses 220a, 260a, 262a are set in each device 220, 260, 262.

(Example of Electronic Mail Communication)

Figure 12:
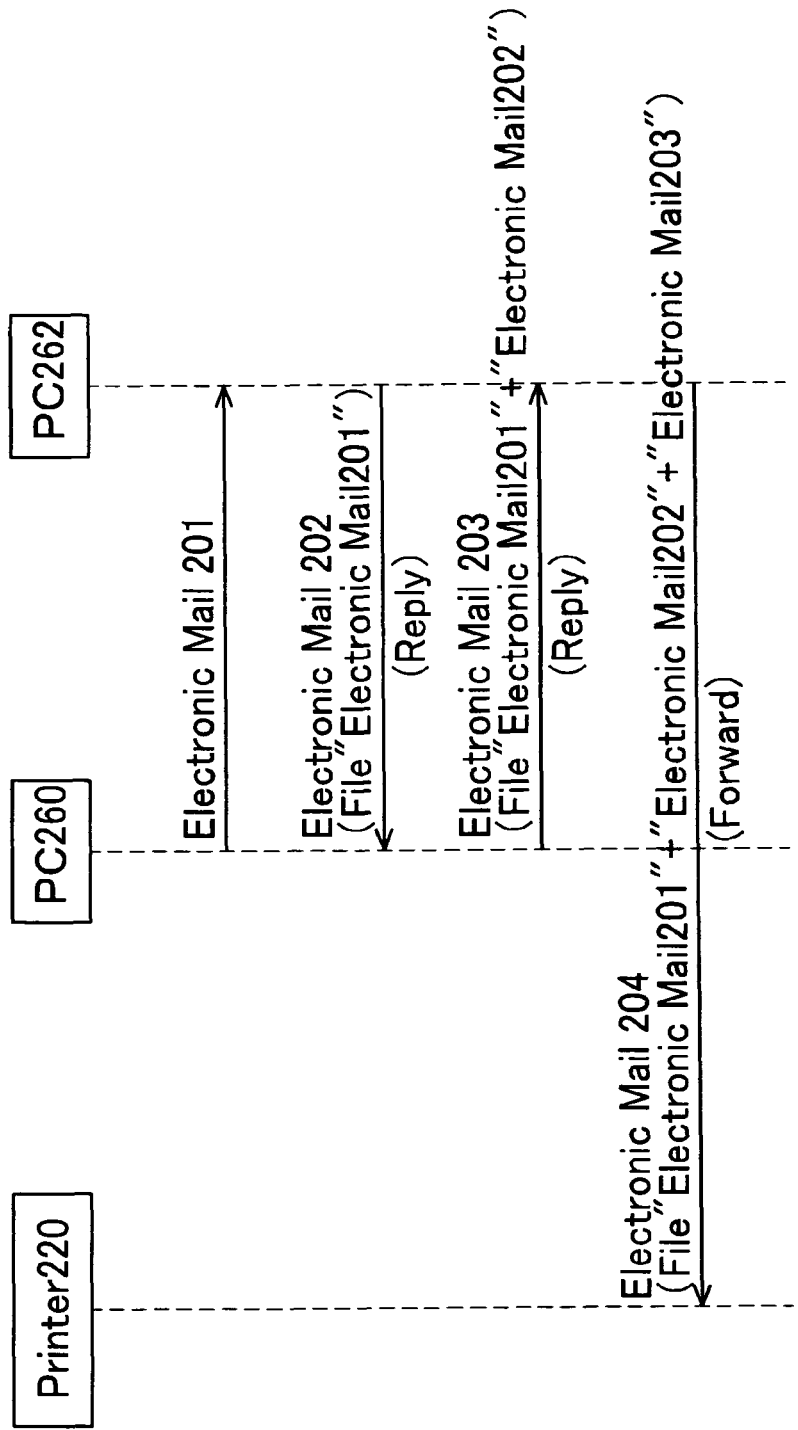
FIG. 12 shows an example of electronic mails communicated between each device.

FIG. 12 shows an example of electronic mails communicated between each of the aforementioned devices 220, 260, 262. In the example of FIG. 12, an electronic mail 201 is sent from the PC 260 to the PC 262. The PC 260 (mailer) of the present embodiment does not create a message ID. The PC 262 replies an electronic mail 202 to the PC 260 based on the electronic mail 201. The PC 262 (mailer) does not create a message ID. Instead, the PC 262 creates a file of the electronic mail 201, and appends this file to the electronic mail 202. The data structure of this file will be described in detail later. The PC 260 replies an electronic mail 203 to the PC 262 based on the electronic mail 202. In this case, the PC 260 creates a file of the electronic mail 202, and appends this file to the electronic mail 203. In this way, the file of the electronic mail 201 and the file of the electronic mail 202 are appended to the electronic mail 203. The PC 262 forwards an electronic mail 204 to the printer 220 based on the electronic mail 203. In this case, the PC 262 creates a file of the electronic mail 203, and appends this file to the electronic mail 204. In this way, the file of the electronic mail 201, the file of the electronic mail 202, and the file of the electronic mail 203 are appended to the electronic mail 204. Note that although not shown in the example of FIG. 12, the printer 220 also can send (reply and forward) electronic mails. The printer 220 (mailer 228) can create files of received mails and append them to sent mails like the aforementioned PC 260, 262.

(Data Structure of Electronic Mail)

Figure 13:
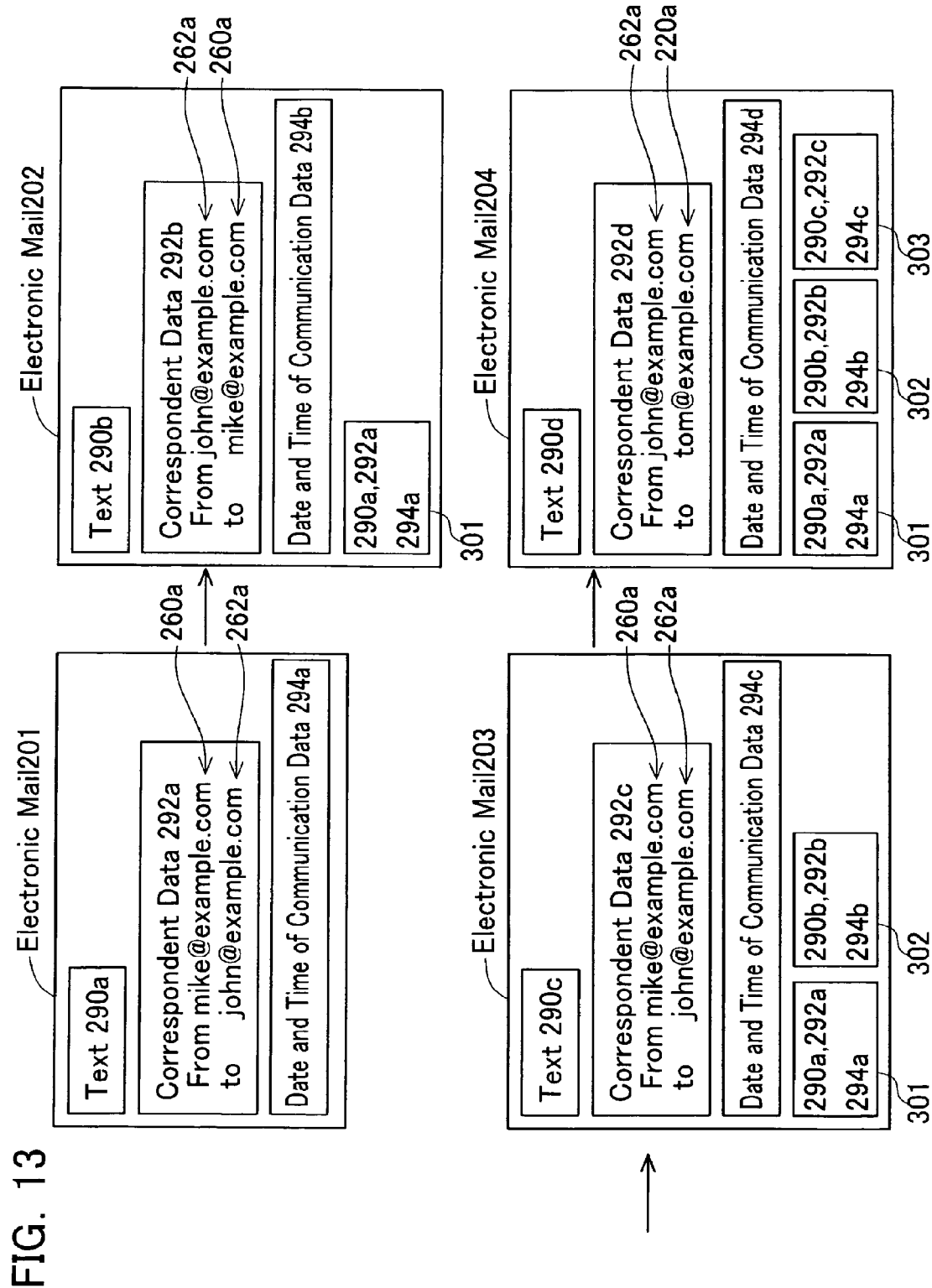
FIG. 13 shows the data structure of an electronic mail.

The data structure of each electronic mail 201 to 204 that was sent in the example of FIG. 12 will be described. FIG. 13 shows the data structures of each electronic mail 201 to 204. The electronic mail 201 includes a text 290a, correspondent data 292a, and date and time of communication data 294a. The electronic mail 202 includes a text 290b, correspondent data 292b, date and time of communication data 294b, and a file 301. The file 301 was created by the PC 262. The file 301 includes the text 290a, the correspondent data 292a, and the date and time of communication data 294a of the electronic mail 201. Note that the text 290b of the electronic mail 202 does not include the text 290a of the electronic mail 201. In other words, each PC 260, 262 (printer 220) does not automatically extract the text of the received electronic mail in the replied (forwarded) electronic mail. The electronic mail 203 includes a text 290c, correspondent data 292c, date and time of communication data 294c, the file 301, and a file 302. The file 302 was created by the PC 260. The file 302 includes the text 290b, the correspondent data 292b, and the date and time of communication data 294b of the electronic mail 202. The file 302 is constructed separately from the file 301, and does not include each data 290a, 292a, 294a of the file 301. The electronic mail 204 includes a text 290d, correspondent data 292d, date and time of communication data 294d, the file 301, the file 302, and a file 303. The file 303 was created by the PC 262. The file 303 includes the text 290c, the correspondent data 292c, and the date and time of communication data 294c of the electronic mail 203. The file 303 is constructed separately from the files 301, 302.

(Processes Executed by the Printer)

Next, the content of the processes executed by the printer 220 will be described. Each of the other PCs 260, 262 can also execute the same processes as the printer 220 (except the print process). Because of this, an explanation of the processes executed by the PC 260, 262 will be omitted. The printer 220 can execute the same process as the aforementioned mail display process of FIG. 5. In other words, the printer 220 can display a list of received mails that are stored in the received mail storage device 230. The user can select one received mail from the list of the received mails by operating the operation device 222. In this case, the CPU 240 of the printer 220 will execute a sequence map creation process.

Figure 14:
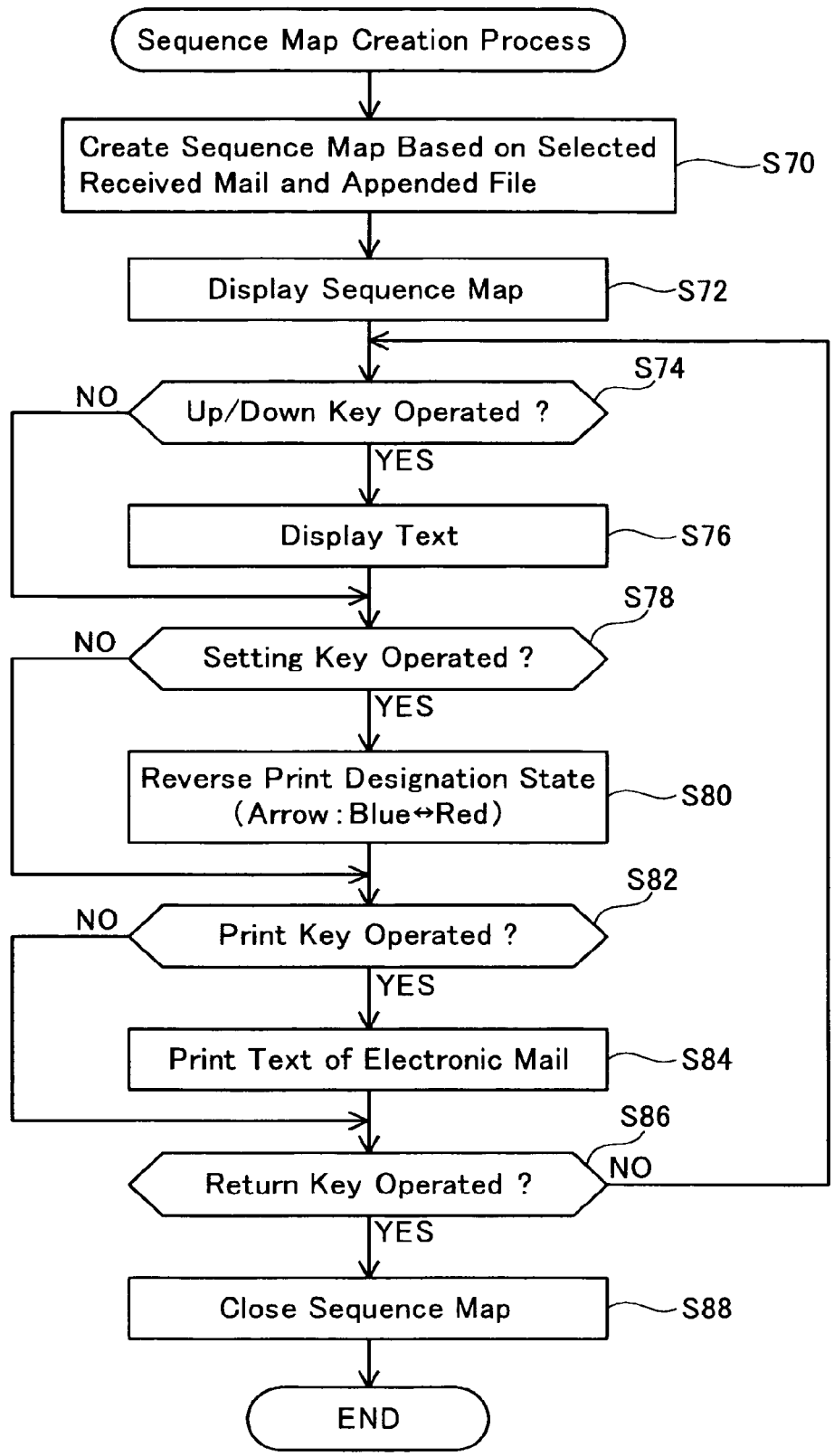
FIG. 14 shows a flowchart of a sequence map creation process.
Figure 15:
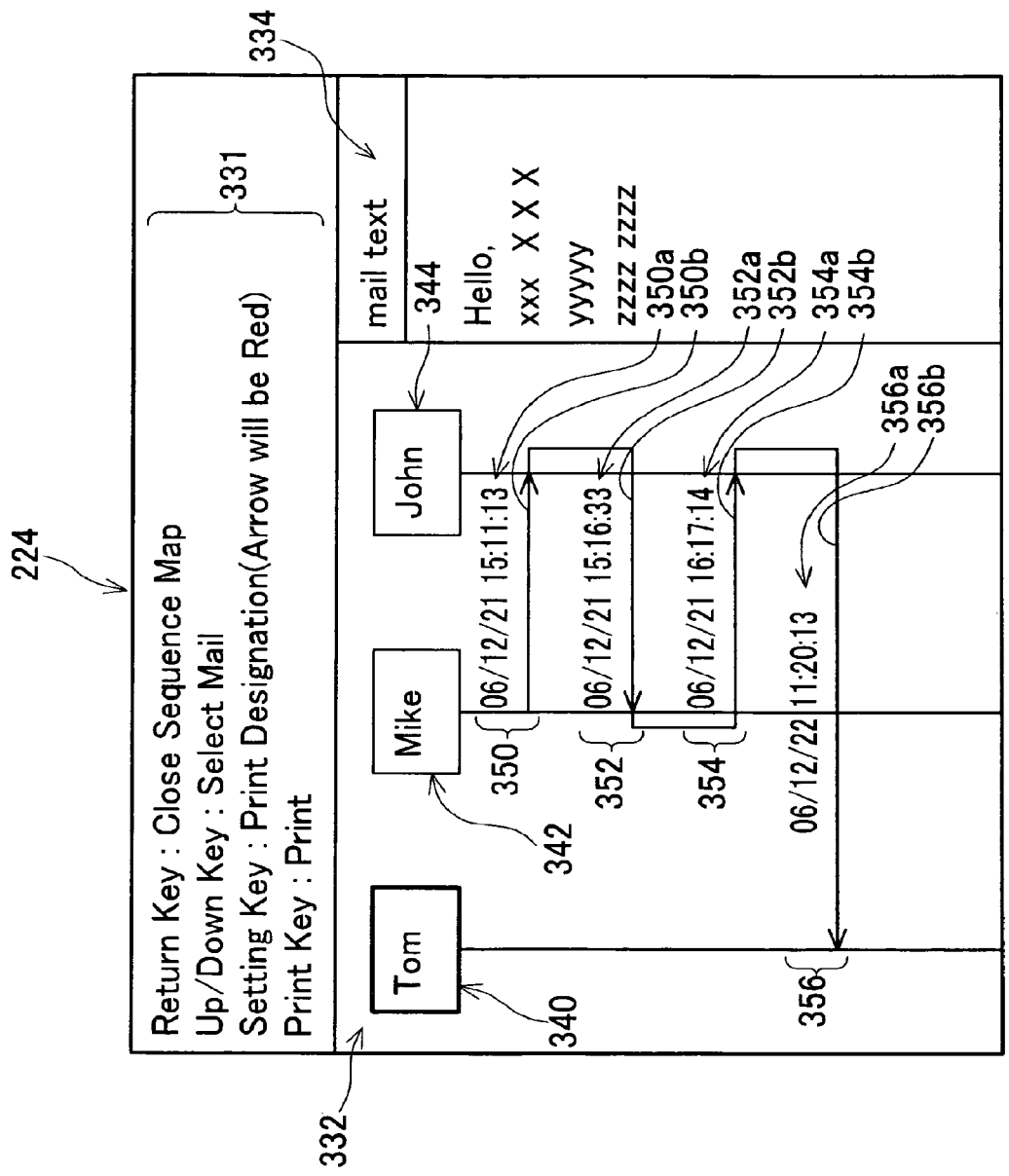
FIG. 15 shows an example of a sequence map.

FIG. 14 shows a flowchart of the sequence map creation process. The CPU 240 executes the process of creating the sequence map based on the received mail selected by the user, and each file 301, etc. appended thereto (S70). The specific method of creating the sequence map will be described below with reference to FIG. 15. Next, the CPU 240 displays the sequence map (S72). FIG. 15 shows an example of the sequence map created based on the aforementioned electronic mail 204 (see FIGS. 12, 13). The display device 224 displays an explanation area 331, a sequence map 332, and a text display area 334. The explanation area 331 includes an explanation text string that issues commands to the user. The sequence map 332 includes a plurality of correspondent objects 340, 342, 344, and plurality of transmission objects 350, 352, 354, 356.

The correspondent objects 340 to 344 have the same construction as the first embodiment. In other words, the correspondent objects 340 to 344 are aligned in the x direction (horizontal direction). In addition, the correspondent object 340 that corresponds to the printer 220 is displayed with a shape that differs from the other correspondent objects 342, 344. The transmission objects 350 to 356 also have the same construction as the first embodiment. In other words, the transmission objects 350 to 356 are aligned in the y direction (vertical direction). Each of the transmission objects 350 to 356 includes a communicated date object 350a to 356a and an arrow object 350b to 356b.

The CPU 240 executes each of the following processes in order to create the aforementioned sequence map 332 in S70.

(1) The CPU 240 identifies the correspondents by referring to the correspondent data 292d of the selected electronic mail 204 (see FIG. 13), and the correspondent information 292a to 292c of each file 301 to 303 appended to the electronic mail 204. In the present embodiment, "Tom", "Mike", and "John" are identified.

(2) The CPU 240 creates the correspondent objects 340, 342, 344 for each of the correspondents identified in the above process (1), and arranges each of the correspondent objects 340, 342, 344 along the horizontal direction. In addition, the CPU 240 draws the correspondent object 340 corresponding to the printer 220 with lines thicker than those of the other correspondent objects 342, 344.

(3) The CPU 240 creates the transmission object 350 based on the oldest file 301. First, the CPU 240 creates the arrow object 350b that extends from the x coordinate that corresponds to the correspondent object 342 of the sender "Mike" included in the correspondent data 292a of the file 301, to the x coordinate that corresponds to the correspondent object 344 of the recipient "John" included in the correspondent data 292a. Furthermore, the CPU 240 creates the communicated date object 350a that indicates the date and time of communication included in the date and time of communication data 294a of the file 301. In this way, the transmission object 350 is completed.

(4) The CPU 240 executes the same process as in the above process (3) for the next file 302. In this way, the transmission object 352 is completed. The transmission object 352 is arranged below the transmission object 350. The CPU 240 executes the same process as in the above process (3) for the file 303. In this way, the transmission object 354 is completed. The transmission object 354 is arranged below the transmission object 352. Finally, the CPU 240 executes the same process as in the above process (3) for the electronic mail 204. In other words, the CPU 204 creates the arrow object 356b that extends from the x coordinate that corresponds to the correspondent object 344 of the sender "John" included in the correspondent data 292d of the electronic mail 204, to the x coordinate that corresponds to the correspondent object 340 of the recipient "Tom" included in the correspondent data 292d. Furthermore, the CPU 240 creates the communicated date object 356a that indicates the date and time of communication included in the date and time of communication data 294d of the electronic mail 204. In this way, the transmission object 356 is completed. The transmission object 356 is arranged below the transmission object 354.

The sequence map is completed by the above processes (1) to (4) (S70). In this way, it is possible to display the sequence map 332 (S72). As shown in the explanation area 331 of FIG. 15, the user can operate the various keys of the operation device 222 in a state in which the sequence map is being displayed. For example, the user can select any of the transmission objects 350 to 356 by operating the up/down keys. The CPU 240 observes the operation of the up/down keys (S74). If the answer here is YES, the CPU 240 displays the text of the electronic mail corresponding to the transmission object that was selected by the user. The text is displayed in the text display area 334 (S76). For example, in the case where the transmission object 350 was selected, the CPU 240 displays the text 290a included in the file 301 in the text display area 334. In this way, the text 290a of the electronic mail 201 is displayed in the text display area 334.

The user can operate the setting key. The CPU 240 observes the operation of the setting key (S78). If the answer is YES here, the CPU 240 changes the color of the arrow object of the transmission object presently selected (the transmission object that the text is presently displayed) (S80). Although unclear in FIG. 15, each arrow object 350b, etc. is colored blue or red. If the setting key was operated, the CPU 240 reverses the color of the arrow object of the transmission object that is presently selected. For example, if the transmission object 350 is presently selected and the arrow object 350b is blue, the CPU 240 changes the arrow object 350b from blue to red when the setting key is operated.

The user can operate the print key. The CPU 240 observes the operation of the print key (S82). If the answer here is YES, the CPU 240 prints the text of the electronic mail corresponding to the transmission object that includes the arrow object of red color (S84). For example, if the transmission object 350 includes the arrow object 350b of red color, the CPU 240 prints the text 290a of the electronic mail 201 when the print key is operated. Note that if there is a plurality of arrow objects of red color, the CPU 240 prints the text of each electronic mail that corresponds to these. The CPU 240 will not print the text of the electronic mails that correspond to transmission objects that include arrow objects of blue color. In other words, the user can select electronic mail(s) to be printed, and delete that selection, by operating the setting key in the aforementioned S78.

The CPU 240 observes the operation of the return key (S86). If the answer here is YES, the CPU 240 completes the display of the sequence map 332 (S88). In this way, the sequence map creation process is completed.

The printer 220 (PC 260, 262) of the present embodiment can display the sequence map 332 based on the received mail. The user can easily understand the reply history and the forwarding history of the received mail by viewing the sequence map 332. A device that implements a convenient function is achieved. In addition, in the present embodiment, the files 301, 302, 303 are appended when replying or forwarding. Because of this, the printer 220 can create the transmission objects 350, 352, 354 for the electronic mail 201, 202, 203 that are not received or transmitted by the printer 220. A correct history can be provided to the user. The user can select an electronic mail from the plurality of transmission objects 350 to 356 included in the sequence map 332, and can print only the selected electronic mail. A novel printer is thereby achieved.

Although embodiments have been described in detail, these are merely illustrations modifications and changes can be made to the aforementioned embodiments. Modifications to the aforementioned embodiments will be enumerated below.

(Modification 1) In each of the aforementioned embodiments, a transmission object corresponding to the received mail selected from the inbox need not be included in the sequence map 132, 332 (see FIG. 9, FIG. 15). For example, in the example of FIG. 9, the transmission object 160 need not be included in the sequence map 132. In addition, for example, in the example of FIG. 15, the transmission object 356 need not be included in the sequence map 332. (Modification 2) Note that in the first embodiment, a transmission object will not be created for an electronic mail (hereinafter referred to as "unstored electronic mail") not stored in the received mail storage device 30 and the sent mail storage device 32 (unknown object 15 will be created). However, the sender, recipient, date and time of communication, text, etc.

of the unstored electronic mail may be identified by referencing the text of replied or forwarded electronic mail extracting the unstored electronic mail. For example, in the example of FIG. 3, the PC 20 may identify the sender, recipient, date and time of communication, text, etc. of the electronic mail 4 by referencing the text of the electronic mail 6. In this case, instead of the unknown object 156, the PC 20 may display a transmission object for the electronic mail 4 on the sequence map 132. (Modification 3) In each of the aforementioned embodiments, the correspondent objects 140, etc. are aligned in the horizontal direction, and the transmission objects 150, etc. are aligned in the vertical direction. However, the correspondent objects 140, etc. may be aligned in the vertical direction, and the transmission objects 150, etc. may be aligned in the horizontal direction. In addition, the direction in which the correspondent objects 140, etc. are aligned and the direction in which the transmission objects 150, etc. are aligned need not necessarily be in a perpendicular relationship. For example, if the correspondent objects 140, etc. are aligned in the horizontal direction, the transmission objects 150, etc. may be aligned in the diagonal direction. (Modification 4) In each of the aforementioned embodiments, the transmission objects 150, etc. (the unknown object 156) are aligned in the vertical direction in substantially equal intervals. However, the actual temporal axis may be used in the vertical direction with the sequence maps 132, 332. In this case, the two transmission objects in which the difference in their date and time of communication is large will be arranged with large intervals, and the two transmission objects in which the difference in their data and time of communication is small will be arranged with small intervals. (Modification 5) The transmission objects may have a shape other than an arrow. For example, the transmission objects may include animation that can identify the direction of transmission (e.g., blinking movement). (Modification 6) In the above embodiments, the sequence map 132, 332 may be printed. This printing may be performed with displaying, and this printing may be performed without displaying.

The invention claimed is:

1. An electronic mail communication device, comprising:
   a receiving device that receives a first electronic mail which is a reply mail or a forward mail of a second electronic mail;
   a sequence map creation device that creates a sequence map in which correspondent objects corresponding to the correspondents of a series of electronic mails relating to the first electronic mail received by the receiving device are arranged along an x direction, and transmission objects indicating from whom and to whom each of the series of electronic mails was transmitted are arranged along a y direction in order of the date and time of communication, wherein the series of electronic mails includes the second electronic mail, the correspondent objects include a first correspondent object corresponding to a sender of the second electronic mail and a second correspondent object corresponding to a recipient of the second electronic mail, and the transmission objects include a specific transmission object indicating that the second electronic mail was transmitted from the sender of the second electronic mail to the recipient of the second electronic mail; and
   an output device that outputs the sequence map created by the sequence map creation device.

2. The electronic mail communication device as in claim 1, wherein in a case where message IDs that identify the series of electronic mails are included in the first electronic mail received by the receiving device, the sequence map creation device creates the sequence map based on the message IDs.

3. The electronic mail communication device as in claim 1, wherein in a case where files corresponding to the series of electronic mails are appended to the first electronic mail received by the receiving device, the sequence map creation device creates the sequence map based on the files.

4. The electronic mail communication device as in claim 1, wherein
   in a case where any transmission object in the sequence map is selected, the output device is capable of outputting the text of the electronic mail corresponding to the selected transmission object.

5. The electronic mail communication device as in claim 1, wherein the output device displays the sequence map created by the sequence map creation device.

6. A non-transitory computer readable medium storing a computer program for an electronic mail communication device, the computer program including instructions that, when executed, cause the electronic mail communication device to perform:
   receiving a first electronic mail which is a reply mail or a forward mail of a second electronic mail;
   creating a sequence map in which correspondent objects corresponding to the correspondents of a series of electronic mails relating to the first electronic mail are arranged along an x direction, and transmission objects indicating from whom and to whom of each of the series of electronic mails was transmitted are arranged along a y direction in order of the date and time of communication, wherein the series of electronic mails includes the second electronic mail, the correspondent objects include a first correspondent object corresponding to a sender of the second electronic mail and a second correspondent object corresponding to a recipient of the second electronic mail, and the transmission objects include a specific transmission object indicating that the second electronic mail was transmitted from the sender of the second electronic mail to the recipient of the second electronic mail; and
   outputting the created sequence map.

7. The non-transitory computer readable medium as in claim 6, wherein the computer program includes instructions that, when executed, cause the electronic mail communicate device to further perform:
   outputting, in a case where any transmission object in the sequence map is selected, the text of the electronic mail corresponding to the selected transmission object.

8. The non-transitory computer readable medium as in claim 6, wherein the outputting corresponds to displaying.

9. An electronic mail communication device, comprising:
   a receiving device that receives a first electronic mail which is a reply mail or a forward mail of a second electronic mail;
   a processor;
   memory having computer readable instructions stored thereon that, when executed by the processor cause the electronic mail device to provide
      a sequence map creation device that creates a sequence map in which correspondent objects corresponding to the correspondents of a series of electronic mails relating to the first electronic mail received by the receiving device are arranged along an x direction, and transmission objects indicating from whom and to whom each of the series of electronic mails was transmitted are arranged along a y direction in order of the date and time of communication, wherein the series of electronic mails includes the second electronic mail, the correspondent objects include a first correspondent object corresponding to a sender of the second electronic mail and a second correspondent object corresponding to a recipient of the second electronic mail, and the transmission objects include a specific transmission object indicating that the second electronic mail was transmitted from the sender of the second electronic mail to the recipient of the second electronic mail; and an output device that outputs the sequence map created by the sequence map creation device.

10. The electronic mail communication device as in claim 9, wherein in a case where message IDs that identify the series of electronic mails are included in the first electronic mail received by the receiving device, the sequence map creation device creates the sequence map based on the message IDs.

11. The electronic mail communication device as in claim 9, wherein in a case where files corresponding to the series of electronic mails are appended to the first electronic mail received by the receiving device, the sequence map creation device creates the sequence map based on the files.

12. The electronic mail communication device as in claim 9, wherein in a case where any transmission object in the sequence map is selected, the output device is capable of outputting the text of the electronic mail corresponding to the selected transmission object.

13. The electronic mail communication device as in claim 9, wherein the output device displays the sequence map created by the sequence map creation device.

* * * * *